Patented Dec. 15, 1953

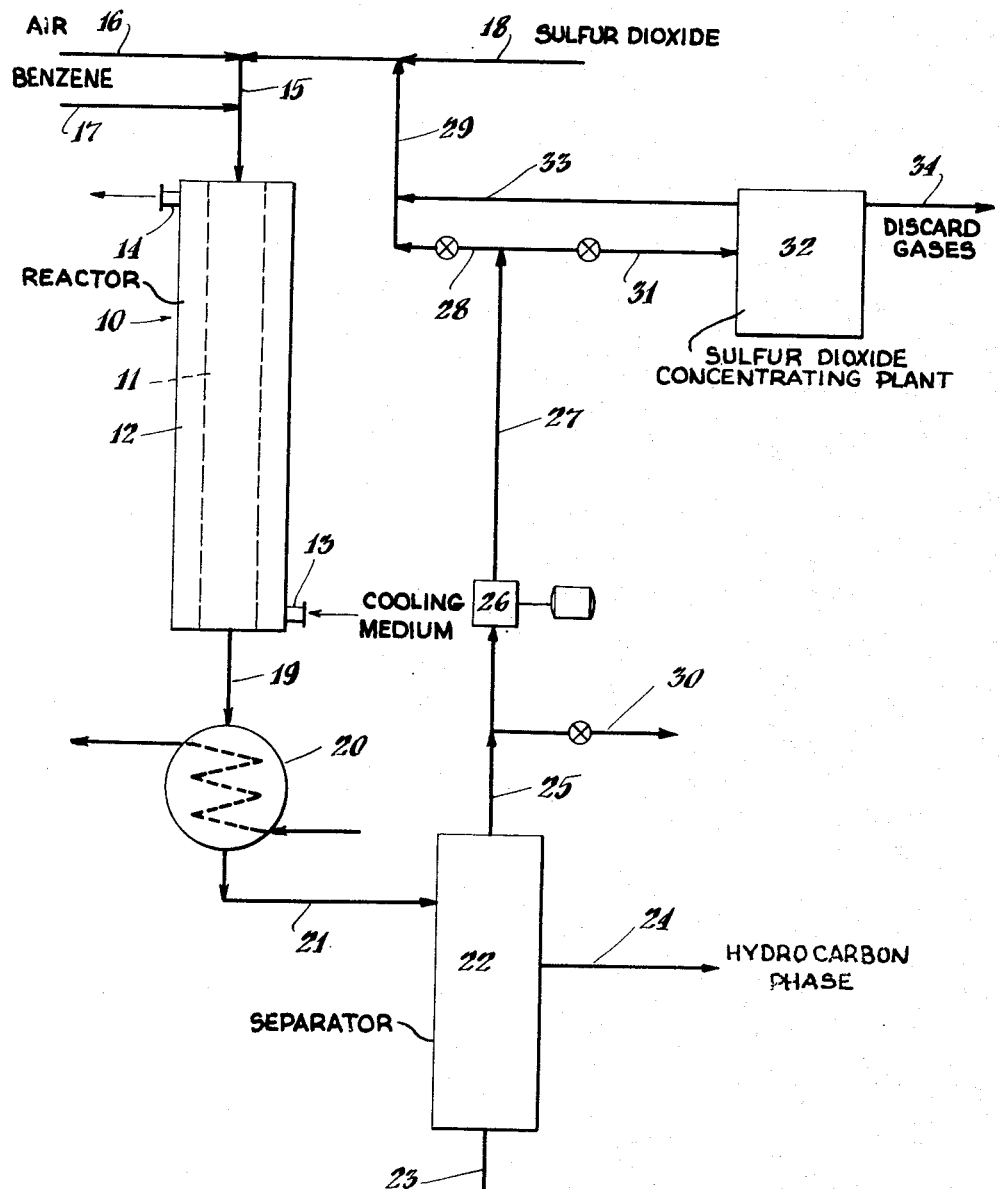

2,662,923

UNITED STATES PATENT OFFICE 2,662,923

OXIDATION OF AROMATIC HYDROCARBONS TO PHENOLS

William H. Reeder III, Olean, N. Y., assignor, by mesne assignments, to Dresser Operations, Inc., Whittier, Calif., a corporation of California Application January 8, 1951, Serial No. 204,878

19 Claims. (Cl. 260—621)

1

The present invention relates to the limited oxidation of aromatic hydrocarbons for the formation of oxygenated compounds, particularly phenols. This application is a continuation-in-part of my prior application Serial No. 676,469, filed June 13, 1946, now abandoned in favor of continuation application Serial No. 278,423, filed March 25, 1952.

In my aforesaid prior application, it has been disclosed that hydrocarbons, including aromatic hydrocarbon benzene, can be converted in good yields to oxygenated compounds by using, under the conditions therein set forth, the sulfur oxides, sulfur trioxide, sulfur dioxide, or mixtures thereof, admixed with oxygen or air, as the oxidizing agent, employing a contact mass comprising an adsorptive material alone or carrying salts or oxides of metallic elements of the Ib periodic group and of the transition elements and mixtures thereof. It was pointed out that in such processes, conducted in the vapor phase for the limited oxidation of hydrocarbons to yield oxygenated compounds, a mixture of sulfur dioxide and oxygen in which the oxygen is present in a minor proportion may be used as the oxidizing agent.

In carrying out the process of the present invention, a vapor phase mixture of an aromatic hydrocarbon, sulfur dioxide and oxygen together with suitable inert diluents, if desired, such as nitrogen, carbon dioxide or the like, is caused to react at a temperature in the range of about 230° C. to 600° C., the effluent reaction gases being then subjected to condensation or stripping for the removal of phenols and other reaction products. The process can be conducted as a single pass operation. However, since in some cases it may be desirable to operate with a low conversion per pass to secure maximum yields, the effluent gases, after removal of the oxygenated products, may be recycled. Aromatic hydrocarbon, sulfur dioxide and oxygen are then supplied to the recycled gases in order to maintain a substantially constant composition of the mixture entering the reaction zone.

The present process is applicable to the treatment of aromatic hydrocarbons, particularly the mononuclear aromatic hydrocarbons like benzene, toluene and xylenes. The selected hydrocarbon must be capable of existing as a vapor at the reaction temperature and pressure. The principal products resulting from the treatment are the corresponding phenols and, in the case of aromatic hydrocarbons having aliphatic side chains, the corresponding aldehydes, ketones, and carboxylic acids in addition to the phenols.

2

The process of this invention generally is markedly improved when the mixture of reactant vapors is made to react while in contact with a mass of solid adsorptive material. Adsorptive materials of widely varying types may be used and it appears that an important characteristic from the standpoint of the desired reaction is their porous, adsorptive character rather than their specific chemical composition, although some variations in behavior may result from the latter. Adsorptive materials that may be employed include activated carbonaceous material, such as activated charcoal; porous siliceous material, such as silica gel, fuller's earth, kieselguhr, aluminum silicates and magnesium silicates; and aluminum oxides such as activated alumina and bauxite. It will be appreciated that in some cases, particularly of natural minerals, the adsorptive materials may be treated preliminarily with a strong acid like sulfuric acid to increase their porosity and improve their adsorptive character.

The beneficial influence of the adsorptive contact mass on the conversion and/or ultimate yield of the desired reaction is often enhanced by the addition of catalyst promoters to the adsorptive contact mass. Metallic salts or oxides which act as catalyst promoters may be deposited on the adsorptive material to increase the effectiveness of the limited oxidation of aromatic hydrocarbons and to decrease the production of the undesired oxides of carbon. Suitable for this purpose are the salts and oxides of the elements of the Ib periodic group and of the transition elements and mixtures thereof. The transition elements include the metals Sc, Ti, V, Cr, Mn, Fe, Co and Ni in the 4th long series; Y, Zr, Cb, Mo, Ma, Ru, Rh and Pd in the 5th long series; La, Ce and the other rare earths, Hf, Ta, W, Re, Os, Ir and Pt in the 6th long series, and Ac, Th, Pa and U in the 7th series. It will be noted that in the long period arrangement of the elements and in the Bohn classification the elements of the Ib group, viz., Cu, Ag and Au, follow immediately the transition elements in their respective series and share with them the property of variable valency. See, for example, Ephraim, Inorganic Chemistry, 4th Ed., Revised, New York, 1943, pages 25 and 29.

When the metallic salts are employed, soluble salts of the selected metals may be dissolved in water and the resulting solution thoroughly mixed with the adsorptive material, which is then dried and heated as hereinafter described. The particular salt or compound which is employed does not appear to affect the reaction.

Thus, chlorides, nitrates, sulfates, acetates or formates or other soluble salts of the metals may be employed, providing they are sufficiently soluble to permit of securing the desired proportion of the metallic salt or salts in the adsorptive material. In general, the inorganic salts are preferred, since they do not leave a carbonaceous residue when the mixture with the adsorptive material is heated to drive off moisture and to activate the mixture, or during reaction. The amount of metallic compound incorporated into the adsorptive material is suitably from about 1% to about 35%, preferably from about 2% to about 15%, based on the weight of adsorptive material. The oxides or other insoluble compounds of the metal selected may be precipitated in the adsorptive material, if desired.

Irrespective of whether or not the adsorptive material contains a metallic catalyst promoter, its effectiveness may frequently be increased by a preliminary heat treatment or activation, which may be carried out either before or after the catalyst has been placed in the reaction chamber in which it is to be used. This treatment may be effected by heating the adsorptive material, with or without promoter, to a high temperature of the order of 400° to 600° C. or higher. The optimum temperature of activation for each adsorptive material or catalyst combination may be selected on the basis of prior tests. Good results are secured by heating the contact mass while passing in contact therewith a stream of air, of sulfur oxides, of the hydrocarbon gas to be oxidized, or of mixtures thereof, providing of course, that if a hydrocarbon is present, the activation temperature is below the cracking temperature of the hydrocarbon. Only a short period of heat treatment is usually required, say ½ to 1 hour.

The partial oxidation of an aromatic hydrocarbon to produce a phenol is conducted in accordance with this process by charging the aromatic hydrocarbon, sulfur dioxide and oxygen into a reaction zone maintained at a temperature of about 230° to 600° C., preferably about 350° to 550° C. Advantageously, the reaction is effected in the presence of an adsorptive contact mass, particularly one containing a catalyst promoter. Since the partial oxidation is exothermic and sensitive to temperature rises, it is advisable to maintain the concentration of oxygen in the total feed stream to the reaction zone within the range of about 2% to 20% by volume, preferably within the range of about 5% to 10% by volume. Stoichiometry will indicate the quantity of aromatic hydrocarbon that should be in the feed stream relative to the oxygen. For instance, the partial oxidation of benzene to phenol:

$$C_6H_6 + \tfrac{1}{2}O_2 \rightarrow C_6H_6O$$

shows that benzene should be used in a volume ratio of the order of two volumes of benzene to each volume of oxygen. The third essential component of the feed stream is sulfur dioxide and to achieve the results of this process it is necessary that at least one volume of sulfur dioxide be present for each volume of oxygen in the total feed stream. In general, a volume ratio of the order of 1.5 volumes of sulfur dioxide per volume of oxygen will give very satisfactory results. It is thus seen that the control of the composition of the total feed stream to the partial oxidation zone is made to revolve around the oxygen concentration (by volume) of that stream. To illustrate, in converting toluene to cresol, the oxygen concentration may be set at 7% by volume of the total feed stream; then, the sulfur dioxide may be 11% by volume of that stream ($SO_2/O_2$ approximately 1.5) and the toluene may be 15% by volume of that stream. However, the foregoing figures account for only 33% by volume of the total feed stream; the remaining 67% is made up of "inerts."

For the purposes of this invention, "inerts" may be the strictly inert gases like nitrogen and carbon dioxide or an excess of the aromatic hydrocarbon or of sulfur dioxide. While both the aromatic hydrocarbon and sulfur dioxide are essential components of the feed stream supplied to the reaction zone, either or both of these components when used in excess of the proportions indicated by the oxygen in the total feed may be part or all of the "inerts" in the total feed. Inasmuch as when the oxygen is consumed the reaction can no longer go forward, it is obvious that excess sulfur dioxide and/or aromatic hydrocarbon is to all intents and purposes inert. To complete the illustration commenced hereinbefore, the 67% by volume of "inerts" may be entirely nitrogen and/or an excess of toluene. If toluene was to provide all of the "inerts," the total feed would have a volume composition of 7% of oxygen, 11% of sulfur dioxide and 82% (15+67) of toluene.

A substantial "inerts" concentration in the total feed to the reactor is beneficial because the "inerts" moderate the exothermic reaction and facilitate control of the reaction temperature by decreasing the chances of developing runaway hot spots in the reaction zone.

Since the process of this invention is carried out with all the components of the feed stream in the vapor state when they are in the reaction zone, it is clear that mention herein of volumes or volume percentages of feed componennts refers to vapor volumes under comparable conditions.

An elevated pressure in the reaction zone is often desirable because it reduces the size of the reactor and the power to recycle effluent gases issuing from the reactor. It is also observed that an elevated pressure generally lowers the reaction temperature and this is advantageous with an exothermic reaction of the type contemplated by this invention because the lower the operating temperature the easier it is to control it within narrow limits. While pressures of 600 p. s. i. g. and higher may be used, the pressure range of about 100 to 300 p. s. i. g. is usually preferred. In any given reaction, it is understood of course that the reaction pressure should not be so high that liquefaction occurs within the reaction zone under operating conditions.

The effluent gases from the reaction zone containing the desired oxygenated compounds as well as sulfur oxide, oxides of carbon, water vapor and unconverted aromatic hydrocarbon may be passed through suitable cooling means whereby condensation of water, hydrocarbon, etc. is effected. In general, the desired oxygenated products will be found to be divided between aqueous and hydrocarbon phases of the resulting condensate. The two liquid phases are subjected to suitable treatment, e. g., distillation or extraction, for the recovery of the desired products. Alternatively, the reaction gases may be brought into contact with a liquid scrubbing medium which preferentially absorbs the desired products which, in turn, are then separated from the scrubbing medium by distillation.

An illustrative embodiment of this invention is represented diagrammatically in the accompanying drawing.

Reactor 10 comprises two concentric tubes forming an inner reaction zone 11 which desirably contains a bed of particulate contact material or catalyst and an annular cooling jacket 12 for regulating the reaction temperature within zone 11. Jacket 12 is supplied with a cooling medium through inlet 13 and the warmed medium is withdrawn through outlet 14. Feed line 15 which is connected to reaction zone 11 is supplied with oxygen, e. g., air, and aromatic hydrocarbon, e. g., benzene, by lines 16 and 17, respectively, while line 18 furnishes sulfur dioxide. These reactants are generally preheated before entering reaction zone 11. The mixed reactants flow through reaction zone 11 maintained at reaction conditions so that the aromatic hydrocarbon is partially oxidized to a phenolic compound. The reaction gases pass from reaction zone 11 through line 19 into condenser 20. Condensate and residual gases flow from condenser 20 through line 21 into separator 22 wherein the condensate forms water and hydrocarbon phases. The water phase is withdrawn through line 23, the hydrocarbon phase through line 24 and uncondensed gases through line 25. The two liquid phases withdrawn through lines 23 and 24 are treated, e. g., by distillation or extraction, to recover the unconverted aromatic hydrocarbon and oxygenated product values therein. Any recovered aromatic hydrocarbon may be recycled to reaction zone 11 by way of lines 17 and 15. The gaseous stream passing through line 25 is rich in sulfur dioxide and it is highly desirable to recycle this sulfur dioxide to reaction zone 11 and thus curtail the quantity of fresh sulfur dioxide that is supplied to line 18 from an extraneous source. The gaseous stream containing sulfur dioxide may be recycled without further treatment by pump 26, line 27, valved branch line 28 and line 29 which discharges into sulfur dioxide supply line 18. When the sulfur dioxide is thus recycled to reaction zone 11, a portion of the gaseous stream passing through line 25 is vented through valved line 30 to prevent the build-up of inerts like nitrogen and carbon oxides in the reaction system. Obviously, some sulfur dioxide will be lost with the vented stream and the lost sulfur dioxide will be replaced by fresh sulfur dioxide supplied by line 18. Alternatively, it may be advisable to decrease the loss of sulfur dioxide. In such case, the valved lines 30 and 28 are closed and all of the gaseous stream containing sulfur dioxide is passed through pump 26, line 27 and valved branch line 31 into concentrating plant 32 wherein by absorption or low-temperature fractionation or other known methods the sulfur dioxide is concentrated or separated from the other gases. The separated sulfur dioxide then flows through lines 33, 29, 18 and 15 into reaction zone 11. The small loss of sulfur dioxide which usually remains in the discard gases vented through line 34 is made up by fresh sulfur dioxide introduced by supply line 18.

The following examples are further illustrative of operations conducted in accordance with the present invention:

*Example 1*

In an operation carried out at a pressure of 270 p. s. i. g. and a temperature of 500° C., the adsorptive catalytic material employed was alumina of 4 to 8 mesh containing 10% by weight of cobalt sulfate and 2.8% by weight of silver nitrate. The catalyst-containing reaction zone was a stainless steel tube with an internal cross-sectional area of 0.1075 sq. in. and contained 4 ml. catalyst. The rate of total reactant feed was 10.92 gram mols per hour and the gasiform reactant feed contained, by volume, 22.9% benzene, 18.1% sulfur dioxide, 11.8% oxygen and 47.2% nitrogen. The percent conversion per pass of the benzene to phenol on a molar basis was substantially 10% and the yield of phenol based on the mols of benzene consumed was slightly over 77%.

Similar operations were conducted at various temperatures throughout the range heretofore referred to and at a pressure of 270 p. s. i. g. with effective yields of phenol. Thus, at 480° C. under otherwise similar conditions of operation with substantially the same composition of the entering reactant gas, the percent conversion of benzene to phenol per pass through the reaction zone on a molar basis was 8.6% and the yield of phenol on the benzene consumed, on a molar basis, was about 71%. In another operation at the same pressure and at a temperature of 290° C., while the percent conversion of benzene to phenol per pass was reduced to about 0.5% on a molar basis, the yield of phenol based on the mols of benzene consumed was still of the order of 70%. In the last mentioned operation, the reactant feed was about 13 gram mols per hour and the composition of the gasiform reactant feed, by volume, was 30.5% benzene, 20% sulfur dioxide, 10% oxygen and 39.5% nitrogen.

In still another operation at 270 p. s. i. g. pressure and a temperature of 550° C., a conversion per pass of benzene to phenol of about 5.5%, on a molar basis, was secured, the yield of phenol on the benzene consumed being about 60%, also on a molar basis. In this operation, the reactant feed was 12.3 gram mols per hour and the composition of the gasiform feed was, by volume, approximately 28% benzene, 19.5% sulfur dioxide, 10.5% oxygen and 42% nitrogen. Diphenyl was noted in the reaction by-products.

*Example 2*

In an operation conducted at a pressure of 140 p. s. i. g. and a temperature of 360° C., using the same catalyst and reaction tube described in Example 1, a conversion per pass of benzene to phenol of about 7% on a molar basis was secured with a yield of phenol on the benzene consumed of about 55%, on a molar basis. In this operation, the reactant feed amounted to 15.3 gram mols per hour and the composition of the gasiform feed was about 24% benzene, 16% sulfur dioxide, 12% oxygen and 48% nitrogen on a volume basis.

In a similar operation conducted at 230° C., the percent conversion per pass on a molar basis was reduced to about 1%, but the yield of phenol on the benzene consumed still amounted to approximately 72% on a molar basis. In this operation, the feed was about 15.5 gram mols per hour and the composition of the feed gas was about 24% benzene, 17% sulfur dioxide, 12% oxygen and 47% nitrogen on a volume basis.

*Example 3*

In an operation carried out at 270 p. s. i. g. pressure and at a temperature of 565° C., the adsorptive material employed was alumina of 4 to 8 mesh with no added metal salts. The reaction tube was of the same size as in Example 1 and contained 15 ml. of alumina. The rate of total reactant feed was 13.4 gram mols per hour and the reactant feed gas contained, by volume, 33.7% benzene, 11.1% sulfur dioxide, 11.0% oxygen, and 44.2% nitrogen. The percent conversion per pass of benzene to phenol was about 4.2% on a molar basis and the yield of phenol on the basis of benzene mols consumed was about 32.5%. Under these conditions, an appreciable quantity of diphenyl was also formed.

Similar operations were conducted at various temperatures as low as 400° C. with effective yields of phenol.

The proportion of carbon dioxide in the gaseous effluent from the reactor will vary but in the more efficient operations, it is found that, in general, it is below about 5% by volume. Usually, the oxygen content of the reaction effluent gas is less than 3% by volume and, in more efficient operations, less than 1% by volume. Small amounts of carbon monoxide may be found in the gases leaving the reaction zone.

In the foregoing examples, nitrogen was used as the inert gas. Carbon dioxide has also been employed as the inert gas with approximately the same results as when using nitrogen, but with some indication of a repression of carbon dioxide formation in the reaction zone.

In carrying out the process of the invention with a homolog of benzene having an aliphatic side chain, such as toluene or xylene, it is found that in addition to the corresponding phenolic compounds, some aromatic aldehydes and carboxylic acids are produced. Thus, toluene yields not only cresols, principally metacresol, but also some benzaldehyde and some benzoic acid.

Within the reaction temperature range herein set forth, at the higher temperatures, higher conversions of aromatic hydrocarbon per pass are achieved. At lower temperatures, lower conversions per pass are in general secured, although this may be modified by the operating pressure, since at higher pressures, higher conversions are obtained. Sometimes, a lower reaction temperature and, hence, lower conversion per pass are selected to attain a higher total yield of oxygenated product based on the mols of aromatic hydrocarbon consumed. In operating under such conditions, the unreacted aromatic hydrocarbon and sulfur dioxide are obviously recycled to the reactor and the problem of closely controlling the reaction temperature is clearly facilitated because of the limited reaction which is taking place in the gasiform stream flowing through the reactor.

The preferred metallic catalyst promoters of the adsorptive contact materials which may be used in the process of this invention are salts of cobalt, copper, iron, vanadium and uranium. A cobalt salt supplemented by a small proportion of a silver salt is a particularly effective metallic catalyst promoter.

Where the process of the invention is conducted in the presence of particulate adsorptive material on a large scale, it is advantageous to use relatively fine particles, say all passing through a 60-mesh screen, and to maintain the particulate mass in a well fluidized condition. Fluidization greatly increases the rate of heat transfer to cooling surfaces in contact with the particulate mass and facilitates the maintenance of the desired reaction temperature uniformly throughout the particulate mass. Fluidization is the technique by which an upwardly flowing gas stream is brought into intimate contact with a mass of finely divided solid particles at such a velocity that the solid particles become suspended in the gas but exhibit slippage or "hindered settling" in the upwardly flowing gas. A fluidized mass of solid particles is characterized by turbulence and random motion of the particles and gives an appearance resembling that of a body of boiling liquid.

As a further guide in producing aromatic oxygenated products in accordance with this invention, it is observed that the space velocity of the reactant gaseous stream flowing through the reaction zone, expressed as volumes of gas per volume of reaction zone per hour, in which expression the gas is measured at reaction temperature and pressure, is generally of the order of 7000 and higher. Space velocities in the range of about 10,000 to 20,000 are frequently very satisfactory.

Although the present invention has been described in connection with the details of various specific embodiments thereof, it will be understood that the invention is not to be regarded as limited to such details except insofar as included in the accompanying claims.

I claim:

1. The method of effecting limited oxidation of aromatic hydrocarbons with formation of phenols which comprises reacting in vapor phase an aromatic hydrocarbon with oxygen in the presence of a volume of sulfur dioxide at least equal to the volume of said oxygen in a reaction zone maintained at a temperature in the range of about 230° to 600° C., and withdrawing from said reaction zone gasiform reaction effluent containing phenol thus formed.

2. The method of claim 1 wherein the reaction is conducted in contact with a solid adsorptive material.

3. The method of claim 2 wherein the solid adsorptive material is activated alumina.

4. The method of claim 2 wherein the solid adsorptive material comprises as catalyst promoter a compound of a metal of the class consisting of the transition elements and the elements of the Ib group of the periodic table.

5. The method of claim 4 wherein the catalyst promoter is a cobalt compound supplemented by a silver compound.

6. The method of producing a phenol by the oxidation of an aromatic hydrocarbon which comprises introducing into a reaction zone maintained at a temperature in the range of about 230° to 600° C. a gasiform reactant mixture comprising said aromatic hydrocarbon, oxygen and sulfur dioxide, the concentration of oxygen in said mixture being within the range of about 2% to 20% by volume and the concentration of sulfur dioxide being at least as great as that of oxygen, and withdrawing from said reaction zone gasiform reaction effluent containing phenol thus produced.

7. The method of claim 6 wherein the reaction zone is maintained at a pressure of about 100 to 300 p. s. i. g.

8. The method of claim 6 wherein the reaction zone contains a contact mass of solid adsorptive material.

9. The method of claim 8 wherein the solid adsorptive material comprises as catalyst promoter a compound of a metal of the class consisting of the transition elements and the elements of the Ib group of the periodic table.

10. The method of producing a phenol by the oxidation of an aromatic hydrocarbon which comprises introducing into a reaction zone maintained at a temperature in the range of about 350° to 550° C. a gasiform reactant mixture comprising said aromatic hydrocarbon, oxygen and sulfur dioxide, the concentration of oxygen in said mixture being within the range of about 2% to 20% by volume and the concentration of sulfur dioxide being at least as great as that of oxygen, and withdrawing from said reaction zone gasiform reaction effluent containing phenol thus produced.

11. The method of claim 10 wherein the aromatic hydrocarbon is benzene.

12. The method of claim 10 wherein the aromatic hydrocarbon is toluene.

13. The method of claim 10 wherein the reaction zone contains a contact mass of solid adsorptive material.

14. The method of claim 10 wherein the concentration of oxygen is within the range of about 5% to 10% by volume and the concentration of sulfur dioxide is of the order of 1.5 times that of oxygen.

15. The method of claim 14 wherein the reaction zone contains a contact mass of silica gel.

16. The method of producing phenol by the oxidation of benzene which comprises introducing into a reaction zone maintained at a temperature in the range of about 230° to 600° C. a gasiform reactant mixture comprising said benzene, oxygen and sulfur dioxide, the concentration of oxygen in said mixture being within the range of about 5% to 10% by volume and the concentration of sulfur dioxide being at least as great as that of oxygen, and withdrawing from said reaction zone gasiform reaction effluent containing phenol thus produced.

17. The method of claim 16 wherein the reaction zone contains a contact mass of activated alumina.

18. The method of claim 17 wherein the contact mass is maintained in a fluidized condition.

19. The method of claim 16 wherein the reaction zone contains a contact mass of solid adsorptive material comprising as catalyst promoter a compound of a metal of the class consisting of the transition elements and the elements of the Ib group of the periodic table.

WILLIAM H. REEDER III.

References Cited in the file of this patent

UNITED STATES PATENTS

| Number | Name | Date |
|---|---|---|
| 1,855,486 | Morrell et al. | Apr. 26, 1932 |
| 2,223,383 | Moyer et al. | Dec. 3, 1940 |
| 2,373,008 | Becker | Apr. 3, 1945 |
| 2,456,597 | Schlesman | Dec. 14, 1948 |